US008462850B2

(12) United States Patent
Mohan et al.

(10) Patent No.: US 8,462,850 B2
(45) Date of Patent: Jun. 11, 2013

(54) MOTION ESTIMATION IN VIDEO COMPRESSION SYSTEMS

(75) Inventors: Sumit Mohan, San Diego, CA (US);
King-Chung Lai, San Diego, CA (US);
Narendranath Malayath, San Diego, CA (US); Jatinder Singh, San Diego, CA (US); Anthony Patrick Mauro, II, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1307 days.

(21) Appl. No.: 11/040,770

(22) Filed: Jan. 20, 2005

(65) Prior Publication Data
US 2006/0002473 A1   Jan. 5, 2006

Related U.S. Application Data

(60) Provisional application No. 60/585,231, filed on Jul. 2, 2004.

(51) Int. Cl.
*H04N 7/12* (2006.01)
(52) U.S. Cl.
USPC ............ 375/240.16; 375/240.01; 375/240.02; 375/240.03; 375/240.04; 375/240.05; 375/240.06; 375/240.12; 375/240.26
(58) Field of Classification Search
USPC ............ 375/240.01–240.06, 240.12–240.16, 375/240.26
See application file for complete search history.

(56) References Cited

U.S. PATENT DOCUMENTS

| | | | | |
|---|---|---|---|---|
| 6,078,618 A * | 6/2000 | Yokoyama et al. | ........... | 375/240 |
| 6,154,491 A * | 11/2000 | Uetani | ...................... | 375/240.16 |
| 6,370,194 B2 * | 4/2002 | Nishikawa | ............... | 375/240.16 |
| 6,526,095 B1 * | 2/2003 | Nakaya et al. | ........... | 375/240.16 |
| 6,549,575 B1 * | 4/2003 | Butter et al. | ............ | 375/240.16 |
| 6,760,888 B2 * | 7/2004 | Killian et al. | ................. | 716/102 |
| 7,376,186 B2 * | 5/2008 | Boyce et al. | ............. | 375/240.15 |
| 2003/0174252 A1 * | 9/2003 | Bellas et al. | .................. | 348/699 |
| 2004/0247029 A1 * | 12/2004 | Zhong et al. | ............ | 375/240.16 |

FOREIGN PATENT DOCUMENTS

| JP | 5328335 A | 12/1993 |
|---|---|---|
| JP | 2003319396 A | 11/2003 |

OTHER PUBLICATIONS

De Vos, Luc et al. "VLSI Architecture for a Flexible Block Matching Processor", IEEE Transactions on Circuits and Systems for Video Technology. New York, NY. Oct. 1995. XP000535993. pp. 417-428.
Dutta, Santanu et al. "A Flexible Parallel Architecture Adapted to Block-Matching Motion-Estimation Algorithms", IEEE, vol. 6, No. 1. XP000625581. pp. 74-86.
Zhang, Xiao-Dong et al. "An Efficient and Reconfigurable VLSI Architecture for Different Block Matching Motion Estimation Algorithms", IEEE 1997. XP000789219. pp. 603-606.
International Search Report—PCT/US2005/022935, International Search Authority—European Patent Office—Sep. 27, 2005.
Written Opinion—PCT/US2005/022935, International Search Authority—European Patent Office—Sep. 27, 2005.
International Preliminary Report on Patentability—PCT/US2005/022935, International Search Authority—The International Bureau of WIPO—Geneva, Switzerland—Jun. 13, 2008.

\* cited by examiner

*Primary Examiner* — Sath V Perungavoor
*Assistant Examiner* — Geepy Pe
(74) *Attorney, Agent, or Firm* — Elaine H. Lo (57) ABSTRACT

Motion estimation in video compressions systems. A programmable motion estimator may be used to estimate a motion vector for a macroblock in a current frame by searching for a matching macroblock in a previous frame. A controller may be used to program the motion estimator to perform a particular search.

32 Claims, 6 Drawing Sheets

MOTION ESTIMATION IN VIDEO COMPRESSION SYSTEMS

RELATED APPLICATIONS

This application claims the benefit of U.S. Provisional Application No. 60/585,231, filed Jul. 2, 2004, entitled AN INSTRUCTION SET THAT ALLOWS FLEXIBILITY IN CHOOSING A SEARCH ALGORITHM FOR MOTION ESTIMATION; which is hereby incorporated herein by reference in its entirety.

BACKGROUND

1. Field

The present disclosure relates generally to telecommunications, and more particularly, to techniques for estimating motion in video compression systems.

2. Background

In the world of telecommunications, where bandwidth is a fundamental limitation, video compression plays an important role in multimedia applications. Video compression can be used to dramatically decrease the information required to represent an image by eliminating redundant and non-essential material. This may be achieved by exploiting the fact that there are very few differences between two adjacent frames in a video sequence. Often the only difference is that some parts of the image have shifted slightly between frames. Video compression can be used to partition a current frame into macroblocks (i.e., a block of pixels) and search the previous frame to determine where each macroblock came from. If the content of the macroblock in the current frame can be located in the previous frame, then it does not need to be reproduced. The content can be represented by a "motion vector" indicating its displacement in the current frame from its position in the previous frame.

A process known as "motion estimation" is often used to determine the motion vectors for each macroblock in a current frame. The process includes a search algorithm that finds the best match between a macroblock in the current frame and a block of pixels from the previous frame. The search algorithm is generally performed using a Sum of Absolute Difference (SAD) computation, which is well known in the art. In particular, the motion estimation compares each macroblock in the current frame with its surrounding area in the previous frame and attempts to find a match indicated by the minimum SAD. The surrounding area is referred to as the "search space" and may be any size depending on the particular application and the overall design constraints.

Maximum video compression may be achieved when the motion estimation process is used to search the entire search space in the previous frame. At one extreme, this involves a comparison with each possible macroblock location in the search space. This type of search is typically referred to as an "exhaustive search." Because the exhaustive search is expensive in terms of computation complexity and hardware, less exhaustive search algorithms have been proposed in the past for motion estimation. These less exhaustive search algorithms, or "limited search" algorithms, may search a considerably lower number of macroblock locations at the expense of compression.

Many existing motion estimation processes utilize a single limited search algorithm implemented in hardware. This restricts motion estimation performance to the algorithm of choice, and may prove to be inadequate in highly dynamic multimedia environments. Accordingly, there is a need in the art for an improved approach to perform motion estimation in video compression systems.

SUMMARY

In one aspect of the present disclosure, a video processor includes a programmable motion estimator configured to estimate a motion vector for a macroblock in a current frame by searching for a matching macroblock in a previous frame, the motion estimator being capable of performing each of a plurality of searches including an exhaustive search and one or more limited searches, and a controller configured to program the motion estimator to perform one of the searches.

In another aspect of the present disclosure, a video processor includes a programmable motion estimator having memory, the motion estimator being configured to estimate a motion vector for a macroblock in a current frame by searching for a matching macroblock in a previous frame, the search including an evaluation of a plurality of macroblocks off an anchor point in the previous frame, and a controller configured to program the motion estimator by loading instructions into the memory, the number of macroblocks evaluated, the location of one of the macroblocks evaluated relative to the anchor point, and the distance between each of the macroblocks evaluated being programmed by one or more of the instructions loaded into the memory.

In a further aspect of the present disclosure, a method of video processing includes receiving instructions, and estimating a motion vector for a macroblock in a current frame by searching for a matching macroblock in a previous frame, the search including evaluating a plurality of macroblocks off an anchor point in the previous frame, wherein one or more of the received instructions includes the number of macroblocks evaluated, the location of one of the macroblocks evaluated relative to the anchor point, and the distance between each of the macroblocks evaluated.

In yet a further aspect of the present disclosure, a video processor includes motion estimation means for estimating a motion vector for a macroblock in a current frame by searching for a matching macroblock in a previous frame, the motion estimation means being capable of performing each of a plurality of searches including an exhaustive search and one or more limited searches; and control means for programming the motion estimation means to perform one of the searches.

In another aspect of the present disclosure, computer readable media embodying a program of instructions executable by a computer performs a method of video processing, the method including receiving instructions, and estimating a motion vector for a macroblock in a current frame by searching for a matching macroblock in a previous frame, the search including evaluating a plurality of macroblocks off an anchor point in the previous frame, wherein one or more of the received instructions includes the number of macroblocks evaluated, the location of one of the macroblocks evaluated relative to the anchor point, and the distance between each of the macroblocks evaluated.

BRIEF DESCRIPTION OF THE DRAWINGS

Various aspects of a video processor are illustrated by way of example, and not by way of limitation, in the accompanying drawings, wherein.

DETAILED DESCRIPTION

The detailed description set forth below in connection with the appended drawings is intended as a description of various embodiments of a video processor and is not intended to represent the only embodiments in which the video processor may be practiced. The detailed description includes specific details for the purpose of providing a thorough understanding of the video processor. However, it will be apparent to those skilled in the art that the video processor may be practiced without these specific details. In some instances, well known structures and components are shown in block diagram form in order to avoid obscuring the concepts of the video processor.

Figure 1:
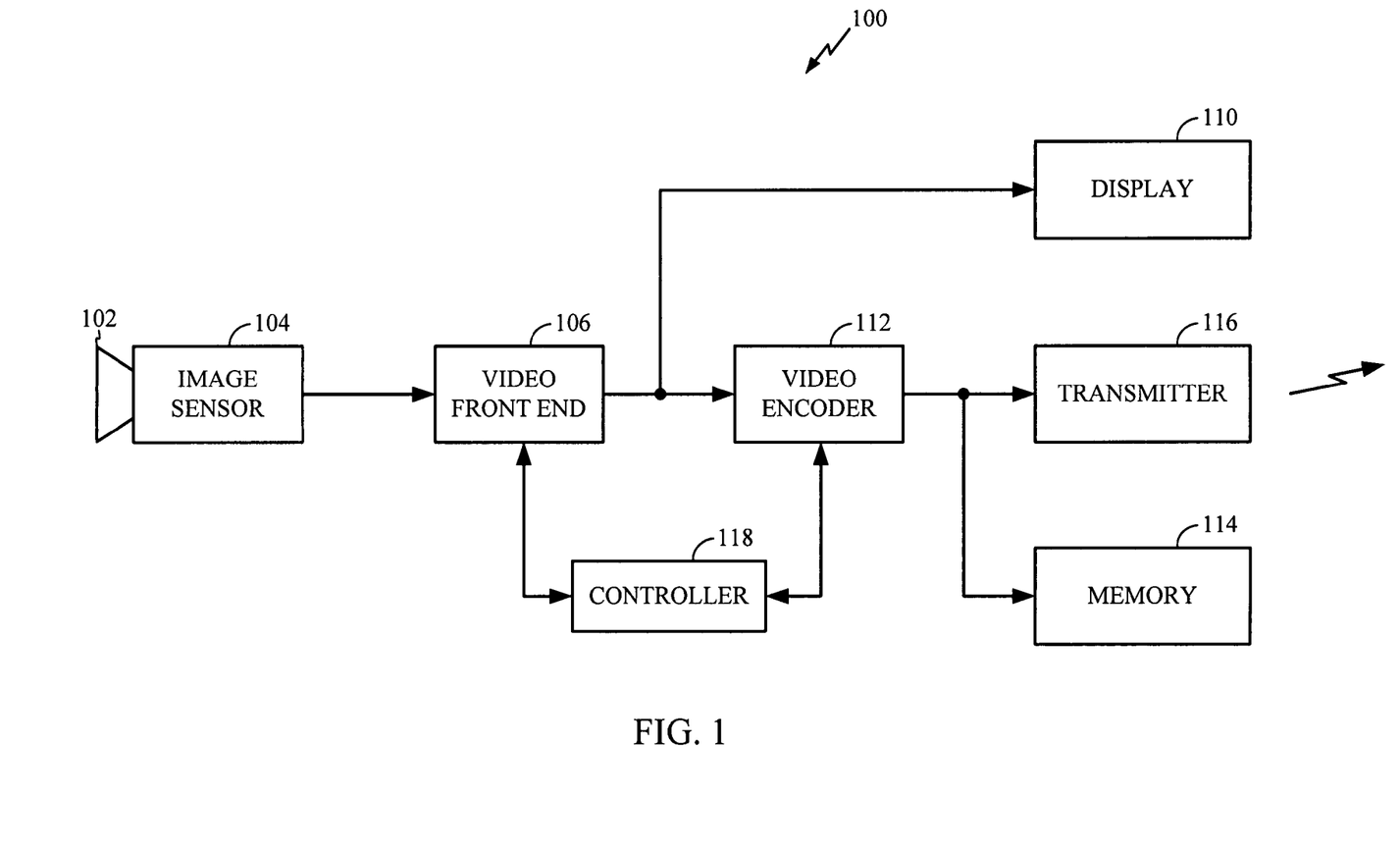
FIG. 1 is a conceptual block diagram illustrating an example of a video processor.

FIG. 1 is a conceptual block diagram illustrating an example of a video processor suitable for integration into a telecommunications device. The telecommunications device may support video broadcasts, video conferencing, video telephony, or any other application requiring the transmission of video. The various concepts described throughout this disclosure are particularly well suited for mobile terminals where size and battery power are of paramount concern. The mobile terminal may be a wireless phone, personal digital assistant (PDA), laptop computer, or any other mobile device.

The video processor 100 may include a lens 102 which focuses an image onto a sensor 104. The sensor 104 may be a charge-coupled device (CCD), a complimentary metal oxide semiconductor (CMOS) image sensor, or any other suitable sensor. A video front end (VFE) 106 may be used to process the image captured by the sensor 104. The processing performed by the VFE 106 may include white balance, color correction, gamma adjustment and/or other processing functions. The processed video image may be presented to a display 110 for viewing and/or a video encoder 112 for compression. The compressed video image may be archived in memory 114 and/or provided to a transmitter 116 for transmission across a network or telecommunications link. A controller 118 may be used to synchronize and control the operation of the video processor 100. The controller 118 will be described as a digital signal processor (DSP) with an embedded communications software layer, but may be implemented with other architectures.

Figure 2:
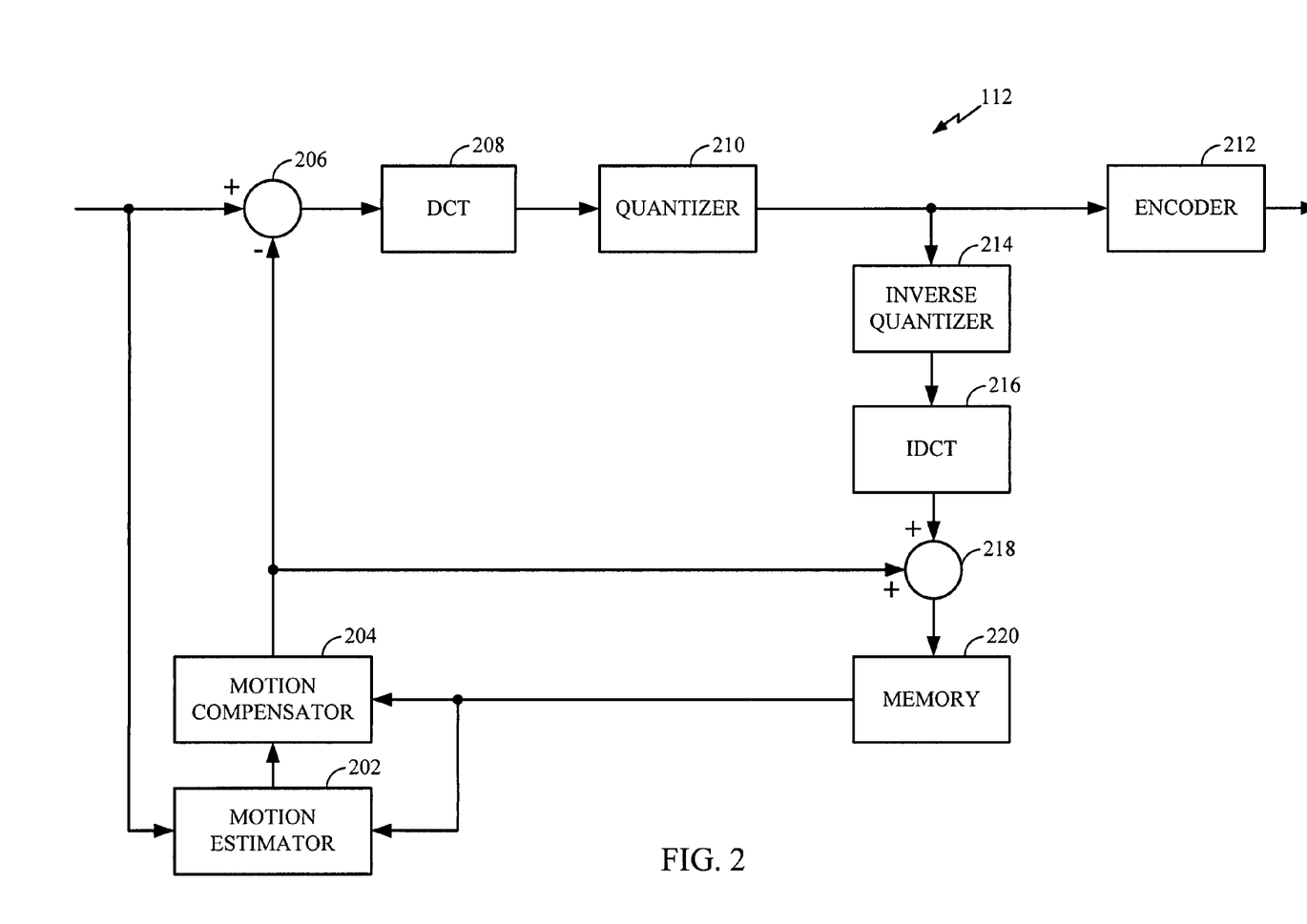
FIG. 2 is a conceptual block diagram illustrating an example of a video encoder in a video processor.

FIG. 2 is a conceptual block diagram illustrating an example of a video encoder in a video processor. The video encoder 112 provides for efficient storage, transmission, and manipulation of video data in various multimedia environments. The video encoding process begins by subtracting the best matching macroblocks from the previous frame with the corresponding macroblocks from the current frame so that only the differences between the two are encoded. This means that the areas of the frame that do not change, such as the background, are not encoded.

A motion estimator 202 may be used to determine a motion vector for each macroblock in the current frame to represent the displacement of that macroblock from its position in the previous frame. The motion estimator 202 performs this function by comparing each macroblock in the current frame with its surrounding area in the previous frame to find the best match. A motion compensator 204 may be used to fetch the best matching macroblock in the previous frame based on the motion vector. A subtractor 206 may be used to compute the difference between the motion compensated macroblock from the previous frame and the macroblock from the current frame.

A Discrete Cosine Transform, an Integer Transform, or any other transform 208 may be used to transform the residual information from the subtractor 206 into discrete spatial frequency coefficients. The transform operation is analogous to transforming a time domain signal into a frequency domain signal using a Fast Fourier Transform (FFT), except that the transform operates on a two-dimensional macroblock rather than a one-dimensional signal. The transform operation is particularly good at compacting the energy of the macroblock into a small number of coefficients. A quantizer module 210 may then be used to further reduce the coefficients produced by the transform 208. The quantizer module 210 reduces the precision of the coefficients so that the coefficients near zero are set to zero, leaving only a few significant non-zero coefficients. This may be performed by dividing each coefficient by an integer and truncating the result.

An encoder 212 may be used to compress the quantized transform coefficients before archiving the information in memory or transmitting it over a network or telecommunications link. There are many well known compression algorithms that may be used. A common method that is often employed involves replacing frequently occurring coefficients with short binary codes and replacing less frequent coefficients with longer binary codes. The result is a sequence of variable-length binary codes. These codes are combined with synchronization and control information to form an encoded bit-stream. The control information includes the motion vectors required to reconstruct the motion compensated frame at the receiver.

The current frame should be stored so that it can be used as a reference frame when the next frame is encoded. Instead of simply copying the current frame into memory, the quantized transform coefficients are inversed quantized 214, inverse transformed using an inverse transform 216, and added 218 to the motion compensated frame to create a reconstructed frame that is stored in memory 220. This process ensures that the contents of the frame stored in memory 220 is identical to the frame reconstructed by the receiver. When the next frame is encoded, the motion estimator 202 uses the contents of the frame stored in memory 220 as the previous frame to determine the best matching area for motion compensation.

Most of the functions involved in the video encoding process exceed the performance capabilities of the General Purpose Processor (GPP) in terms of computational power and memory bandwidth. On the other hand, an architecture dedicated solely to video encoding would enable high performance, but would not be very flexible. By way of example, motion estimation implemented in hardware would be limited to a single search algorithm. To maintain a reasonable degree of balance between performance and flexibility, a Digital Signal Processor (DSP), or other processing entity, may be used in combination with programmable hardware. In this configuration, the DSP controls the programming and the execution of the various hardware components.

Figure 3:
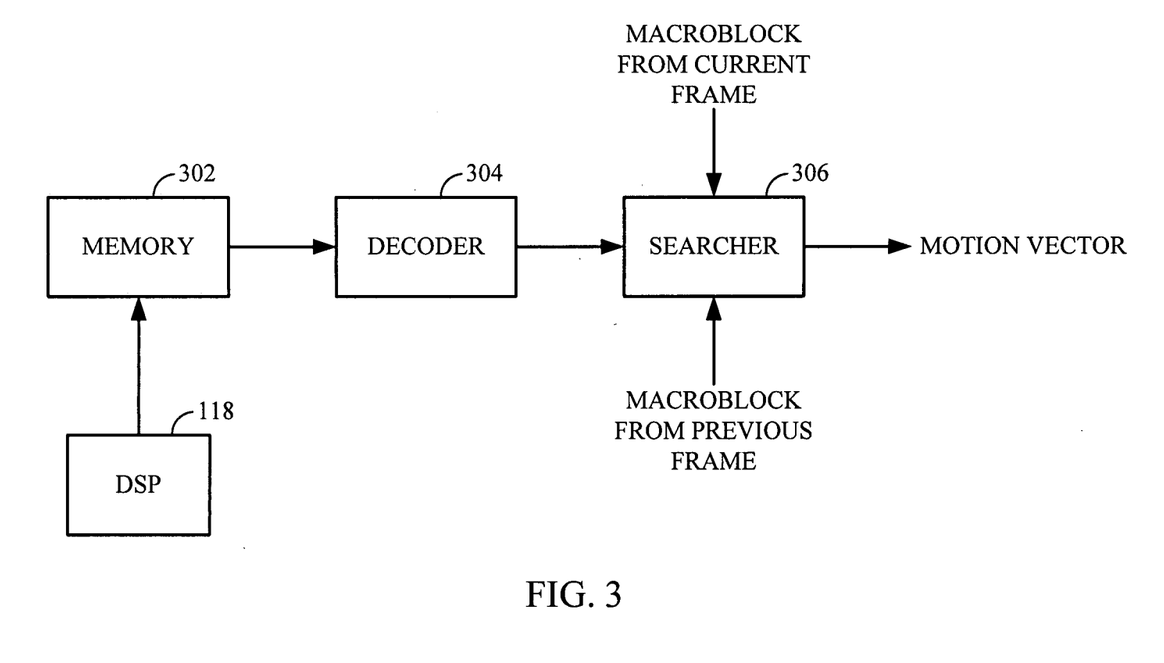
FIG. 3 is a conceptual block diagram illustrating an example of a motion estimator in a video encoder.

An example of this architecture will now be described in connection with motion estimation. Referring to FIG. 3, a DSP 118 may be used to program the hardware used to implement the motion estimator 202. The hardware provides the computational power required to perform motion estimation, while the DSP preserves the flexibility to program any search algorithm depending on the multimedia environment. The DSP 118 programs the motion estimator 202 by loading instructions into memory 302. A decoder 304 may be used to decode the instructions in memory 302, and a searcher 306 may be used to estimate movement of macroblocks over a sequence of frames. The searcher 306 may be implemented as a SAD engine with a tree architecture. The tree architecture provides good flexibility for choosing the search locations for limited searches dictated by the instructions in memory 302.

Figure 4:
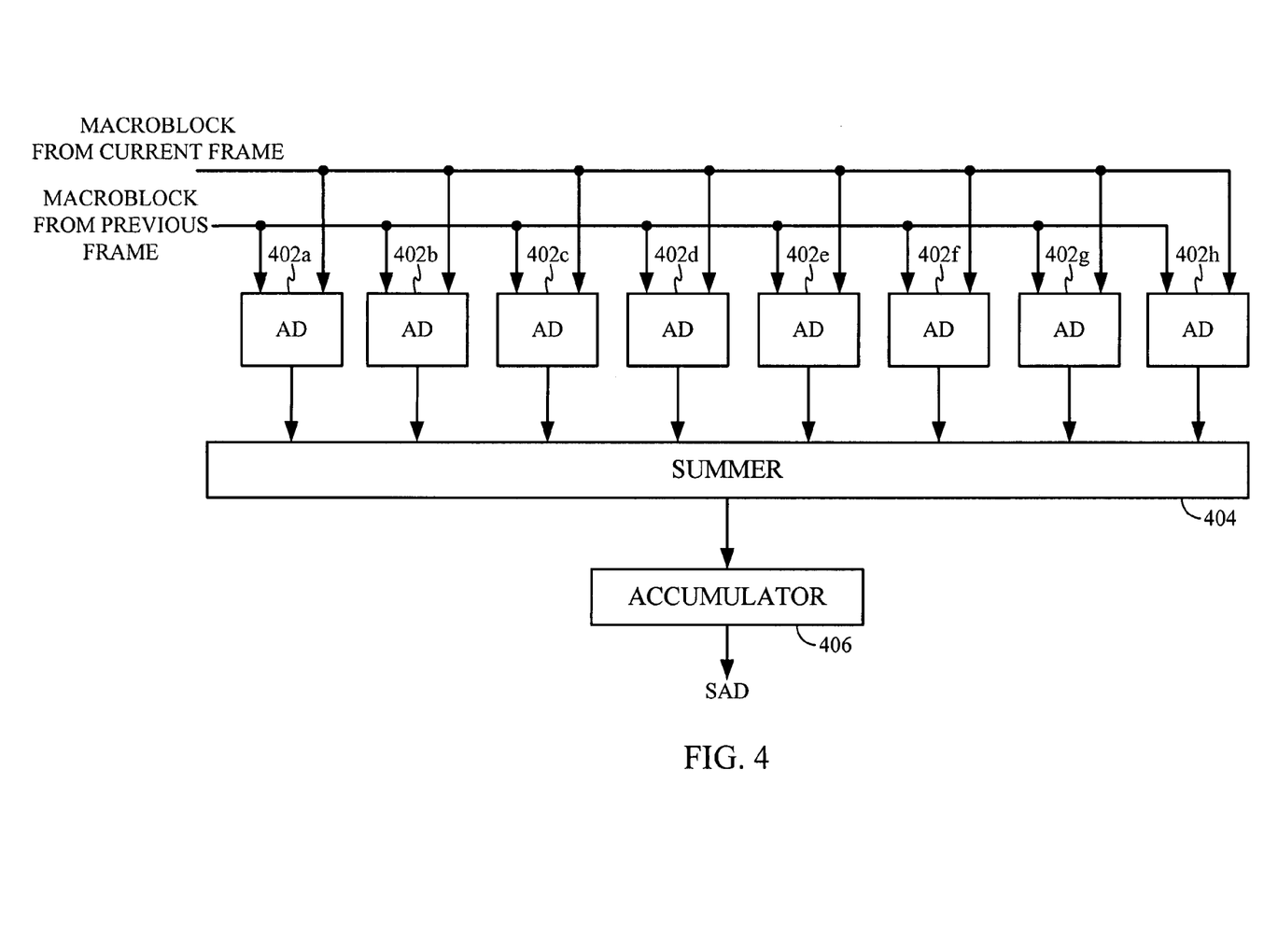
FIG. 4 is a schematic block diagram illustrating an example of a SAD computation used for motion estimation in a video encoder.

FIG. 4 is a schematic representation of a tree architecture for the SAD computation engine. The tree architecture may be configured with any number of Absolute Difference (AD) modules at the input, and in this example, there are eight. The eight AD modules 402a-402h may be configured to receive information from 8 pixels in the macroblock for the current frame and information from 8 pixels in a macroblock in the previous frame for every cycle. Each AD module computes the absolute value of the difference between the two corresponding pixels presented at its input. An adder 404 may be used to sum the eight absolute difference values, and an accumulator 406 may be used to accumulate the results over a number of clock cycles sufficient to compute an absolute difference value over all corresponding pixels in the two macroblocks. In a macroblock comprising an array of 16×16 pixels, the output of the adder 404 will be accumulated 32 times to compute the absolute difference value between the macroblock in the current frame and a macroblock in the previous frame.

To increase the flexibility of the motion estimation process, a new instruction set may be defined. The number of instructions should be limited to reduce the hardware requirements and ensure that the instructions can be decoded and executed in real-time for large frames at high frame rates. In one embodiment of a video encoder, the DSP uses four different types of instructions that can be programmed into the motion estimator. The instructions include a "Search Task" instruction, a "Loop" instruction, a "New Iteration" instruction, and an "End of Search" instruction. As will be explained in greater detail shortly, these instructions are flexible enough to program any search algorithm for motion estimation.

A Search Task instruction allows the motion estimator to search any number of macroblock locations in the search space with corresponding locations along the same horizontal, vertical or diagonal line of the frame. The Search Task instruction may include a NUM_STEP identifying the number of macroblocks to be searched, (OFFSET_X, OFFSET_Y) coordinates identifying the location of the first macroblock to be searched relative to an anchor point, and (STEP_X, STEP_Y) coordinates to compute the locations of the remaining macroblocks to be searched. For each macroblock location searched, the searcher computes the SAD.

A Loop instruction may be used to loop back to a previous Search Task instruction. This instruction will cause the searcher to repeat a block of instructions previously executed, except with a new anchor point. In particular, the lowest SAD computed up to that point will be used as the new anchor point. The Loop instruction may include a loop address "LOOP_ADDR" that identifies which instruction the searcher should loop back to. The maximum number of times the Loop instruction is executed may be controlled by a "MAX_NUM_LOOP" code in the Loop instruction. Once the searcher has repeated a previous block of instructions the maximum number of times, it will exit the loop and execute the next instruction.

In one embodiment of the searcher, the Loop instruction is only executed if the distance between the new anchor point and the previous anchor point exceeds a threshold. If the distance between the new and previous anchor point is too small, the searcher will exit the loop and execute the next instruction.

A New Iteration instruction may follow either a Search Task instruction of a Loop instruction. It may be used to select the coordinates for the lowest SAD computed until that point as the new anchor point for the next Search Task instruction(s).

A new Search Task instruction, following the New Iterative instruction, may be used to perform a more exhaustive search within a confined region of the search space. This may be achieved by (1) reducing the offset from the new anchor point (OFFSET_X, OFFSET_Y) to perform the first macroblock search and SAD computation, and (2) reducing the distance between the remaining macroblock searches and SAD computations (STEP_X, STEP_Y).

Figure 5:
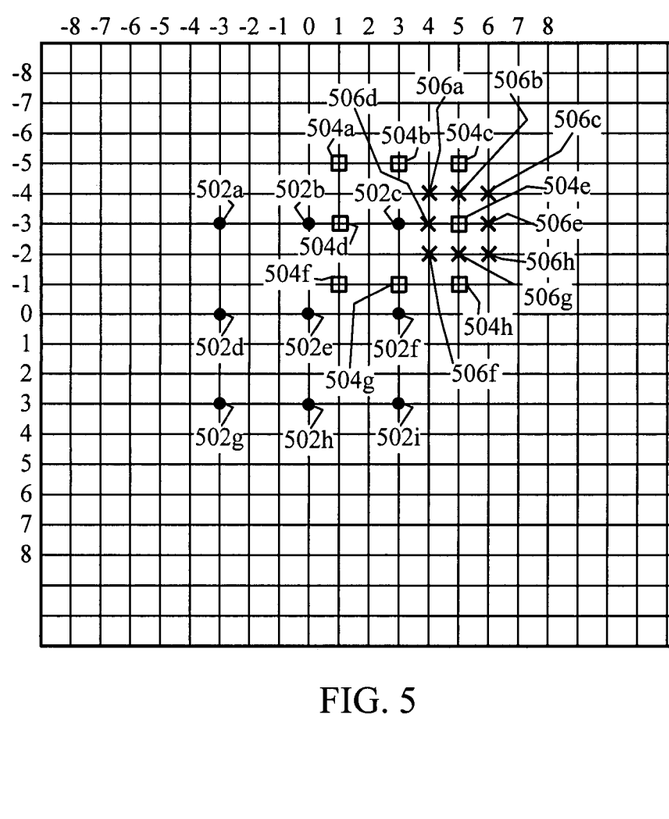
FIG. 5 is a graphical diagram illustrating an example of a three step search for estimating motion in a video encoder.

FIG. 5 is a graphical illustration of a three-step search algorithm, and the instructions programmed into memory in the motion estimator to perform the search are listed in Table 1 below. The anchor points for the x, y coordinates for the initial Search Task instruction are both set to 0.

TABLE 1

| Memory Address | [31:30] | NUM_STEP | STEP_X | STEP_Y | OFFSET_X | OFFSET_Y | Comments |
|---|---|---|---|---|---|---|---|
| 0 | "00" | 3 | +3 | 0 | −3 | −3 | Step 1 |
| 1 | "00" | 3 | +3 | 0 | −3 | 0 | Use 1st Anchor Pt. |
| 2 | "00" | 3 | +3 | 0 | −3 | +3 | |
| 3 | "01" | | | | | | Next Iteration |
| 4 | "00" | 3 | +2 | 0 | −2 | −2 | Step 2 |
| 5 | "00" | 3 | +2 | 0 | −2 | 0 | Use 2nd Anchor Pt. |
| 6 | "00" | 3 | +2 | 0 | −2 | +2 | |
| 7 | "01" | | | | | | Next Iteration |
| 8 | "00" | 3 | +1 | 0 | −1 | −1 | Step 3 |
| 9 | "00" | 3 | +1 | 0 | −1 | 0 | Use 3rd Anchor Pt. |
| 10 | "00" | 3 | +1 | 0 | −1 | 1 | |
| 11 | "11" | | | | | | End of Search |

In this example, twelve instructions are loaded into the memory in the motion estimator by the DSP. The instructions are read out of the memory by the decoder in a sequential fashion. A two-bit TASK_KEY in each instruction may be used to identify the type of instruction (i.e., Search Task instruction, Loop instruction, New Iteration instruction, or End of Search instruction). Each instruction is decoded and then executed by the searcher in the motion estimator. For each Search Task instruction, the SAD computation engine computes the SAD between the macroblock in the current frame and all macroblocks in the previous frame identified in the instruction and maintains the smallest SAD value and the corresponding macroblock location.

In the first step of the search, three Search Task instructions are used create a grid of nine pixels 502a-502i, with each pixel in the grid locating one macroblock to be searched. The pixels 502a-502i are spaced apart from their neighboring pixels by three pixels in both the horizontal and vertical directions. The NUM_STEP portion of the first instruction from memory address "0" initiates three macroblock searches. The (OFFSET_X, OFFSET_Y) coordinates in the first instruction locate the first macroblock 502a to searched. In this example, the first macroblock 502a is offset from the initial anchor point (0,0) by (−3,−3) (i.e., three pixel positions in the negative horizontal direction and three pixel positions in the negative vertical direction). The (STEP_X, STEP_Y) coordinates in the first instruction locate the remaining macroblocks to be searched. Specifically, each of the remaining macroblocks 502b, 502c to be searched are located (+3,0) steps from the previous macroblock. Thus, the second macroblock 502b is located at the same vertical position as the first macroblock 502a, but three pixel positions to the right. The third macroblock 502c is similarly situated with respect to the second macroblock 502b. That is, the third macroblock 502c is located at the same vertical position as the second macroblock 502, but three pixels to the right.

The second instruction at memory address "1" is decoded and executed next. The NUM_STEP portion of the second instruction again indicates that three macroblocks will be searched, but this time each macroblock will be located three pixels directly below the first three macroblocks searched. The (OFFSET_X, OFFSET_Y) coordinates in the second instruction locate the fourth macroblock 502d to be searched (−3,0) from the initial anchor point (0,0) (i.e., three pixel positions in the negative horizontal direction). The (STEP_X, STEP_Y) coordinates in the second instruction locate the remaining macroblocks to be searched. Specifically, each of the remaining macroblocks 502e, 502f to be searched are located (+3,0) steps from the previous macroblock. Thus, the fifth macroblock 502e is located at the same vertical position as the fourth macroblock 502d, but three pixel positions to the right, and the sixth macroblock 502f is located at the same vertical position as the fifth macroblock 502e but three pixels to the right.

The third instruction at memory address "2" is decoded and executed next. This instruction is similar to the two that preceded it in that three macroblocks 502g-502i, spaced apart by three pixels in the horizontal direction, are searched. This information is contained in the NUM_STEP portion and the (STEP_X, STEP_Y) coordinates of the third instruction. The difference with this instruction is that the three macroblocks 502g-502i are located directly below the fourth, fifth and sixth macroblocks 502d-502f by three pixels. The location of these three macroblocks 502g-502i is driven by the (OFFSET_X, OFFSET_Y) coordinates in the third instruction which locate the seventh macroblock 502g to be searched (−3,+3) from the initial anchor point (0,0) (i.e., three pixel positions in the negative horizontal direction and three pixel positions in the positive horizontal direction).

Before initiating the second step of the search, a new iteration is performed. The new iteration is prompted by the fourth instruction from memory address "3." The TASK_KEY for the fourth instruction, which identifies it as a New Iteration instruction, causes the SAD computation engine to create a new anchor point at the macroblock in the previous frame having the smallest SAD.

The next three instructions are used to perform the second iteration of macroblock searches around the macroblock with the lowest SAD from the previous iteration. The second iteration of macroblock search locations are shown in FIG. 5 by a grid of eight pixels 504a-504h, with each pixel 504a-504h representing one macroblock location to be searched. The second iteration of the search is more focused with each pixel 504a-504h being spaced apart from its neighboring pixels by two pixels in both the horizontal and vertical directions.

The fifth instruction from memory address "4" results in three macroblock searches, with the first macroblock 504a searched offset from the new anchor point (+3,−3) by two pixels in both the negative horizontal and vertical directions. The remaining two macroblocks 504b, 504c to be searched are spaced by two pixel locations in the horizontal direction from the macroblock immediately searched prior. That is, the second macroblock 504b searched is two pixel positions to the right of the first macroblock 504a searched, and the third macroblock 504c searched is two pixel positions to the right of the second macroblock 504b searched.

The sixth instruction from memory address "5" results in a search of two macroblocks 504d, 504e immediately below the first and third macroblocks 504a, 504c by two pixels in the vertical direction. Similarly, the seventh instruction from memory address "6" results in a search of three macroblocks 504f-504h, immediately below the first, second and third macroblocks 504a-504c by four pixels in the vertical direction.

The next four instructions in memory may be used to prompt a final iteration of macroblock searches around the macroblock with the lowest SAD from the second iteration. The final iteration of macroblock search locations are shown in FIG. 5 by a grid of eight pixels 506a-506i, with each pixel 506a-506i representing one macroblock location to be searched. The final iteration of the search is more focused than the second iteration with each pixel 506a-506i being spaced apart from its neighboring pixels by one pixel in both the horizontal and vertical directions.

The last instruction in memory address "11" is an End of Search instruction. The End of Search instruction terminates the search. At the end of the search, a motion vector may be computed from the macroblock location with the lowest SAD.

Figure 6:
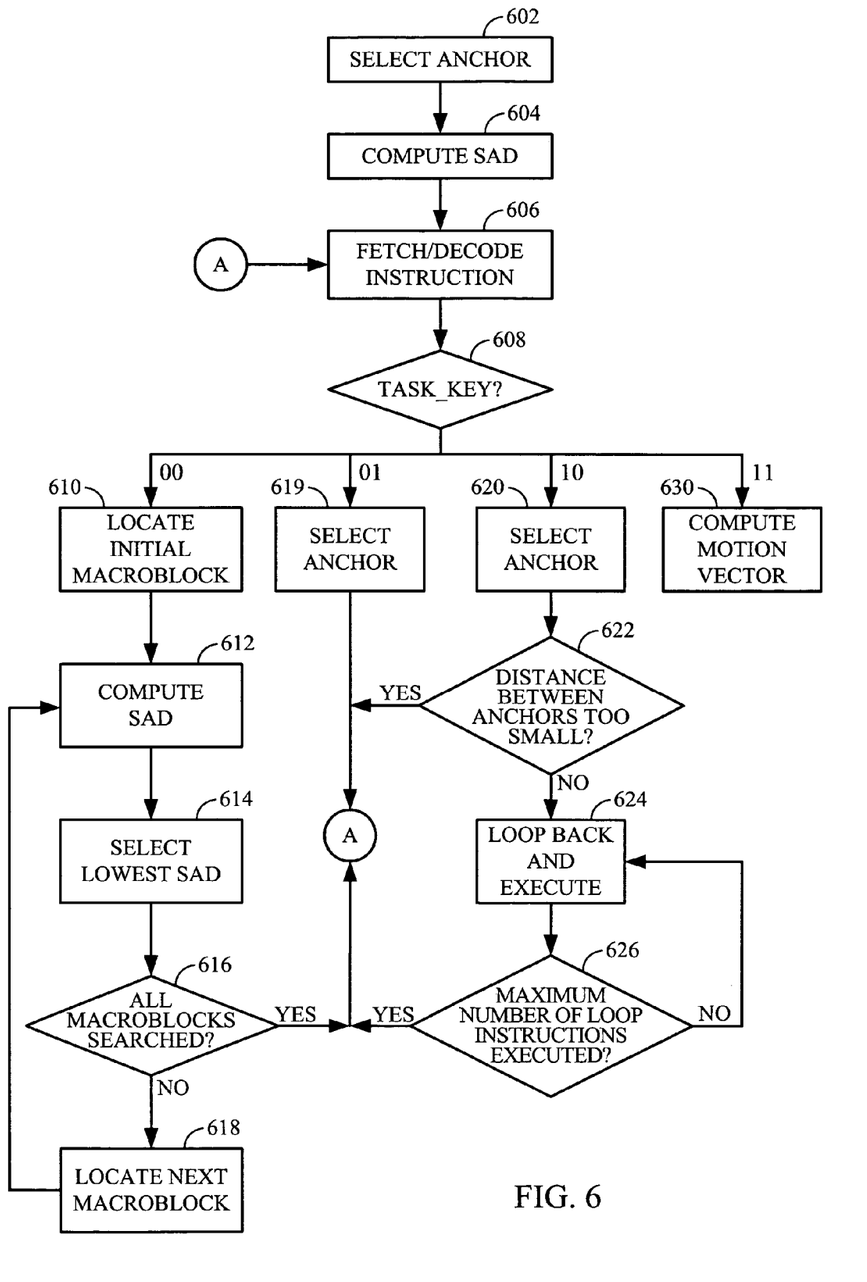
FIG. 6 is a flow diagram illustrating the functionality of a SAD computation engine in a motion estimator.

FIG. 6 is a flow diagram illustrating the operation of the SAD computation engine. In this example, a two-bit TASK_KEY assigns the code "00" to a Search Task instruction, "01" to a New Iteration instruction, "10" to a Loop instruction, and "11" to an End of Search instruction. These bit assignments are made to illustrate the operation of the SAD computation engine. In practical applications, the bit assignments may vary depending on the preferences of the designer.

In step 602, an initial anchor point is selected. The location of the anchor point can be selected to correspond to the macroblock in the current frame, or alternatively, be intelligently selected. An intelligent selection of the macroblock in the previous frame may be based on the observed movement of the macroblock in the current frame over any number of previous video frames. In any event, the SAD between the macroblock in the current frame and the macroblock in the previous frame located at the selected anchor point may be computed and stored in step 604.

Next, in step 606, an instruction is fetched from memory and decoded. The SAD computation engine checks the TASK_KEY in step 608 to determine the type of instruction to execute. If the TASK_KEY code is "00", the SAD computation engine identifies the instruction as a Search Task instruction. The SAD computation engine executes the Search Task instruction by locating the first macroblock to be searched using the (OFFSET_X, OFFSET_Y) coordinates in the instruction in step 610, and computes the SAD in step 612. If the computed SAD is less than the stored SAD, then the stored SAD is discarded and the computed SAD stored. If the computed SAD is higher than the stored SAD, then the computed SAD is discarded. This operation is performed in step 614. The SAD computation engine checks the NUM_STEP portion of the instruction to see if the all the macroblocks identified in the instruction have been searched in step 616. If not, the SAD computation engine locates the next macroblock using the (STEP_X, STEP_Y) coordinates of the instruction in step 618, and loops back to step 612 to compute the SAD. Otherwise, the SAD computation engine prompts the next instruction to be fetched and decoded in step 606.

If the TASK_KEY code for the next instruction is "01," then the SAD computation engine initiates a new iteration. Specifically, in step 619, the SAD computation engine sets a new anchor point at the macroblock location with the lowest SAD from the previous iteration (i.e., the macroblock location for the stored SAD). The SAD computation engine then loops back to step 606 to fetch and decode the next instruction.

If the TASK_KEY code for the next instruction is "10," then the SAD computation engine sets a new anchor point at the macroblock location with the lowest SAD from the previous iteration in step 620. The SAD computation engine then compares the distance between the new anchor point and the anchor point from the previous iteration in step 622. If the SAD computation engine determines that the distance is too small, it exits the loop and prompts the next instruction to be fetched and decoded in step 606. Otherwise, the SAD computation engine loops back to the instruction indicated by the LOOP_ADDR and executes that instruction from the new anchor point in step 624. The SAD computation engine continues to sequentially execute instructions until it reaches the Loop instruction again. At that point, the SAD computation engine determines whether the previous block of instructions have been executed the maximum number of times, in step 626, as indicated in the MAX_NUM_LOOP code. If the SAD computation engine has not looped back to the previous instruction indicated by the LOOP_ADDR the maximum number of times, then it loops back to that instruction again in step 624. Otherwise, it exits the loop and prompts the next instruction to be fetched and decoded in step 606.

If the TASK_KEY code for the next instruction is "11," the search computation engine identifies the instruction as an End of Search instruction. In that case, the SAD computation engine, or other entity, computes the motion vector representing the displacement of the macroblock in the current frame from its position in the previous frame in step 630. The position of the macroblock in the previous frame corresponds to the stored SAD.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A video processor, comprising:
a motion estimator configured to estimate a motion vector for a macroblock in a current frame by searching for a matching macroblock in a previous frame according to instructions, the motion estimator configured to perform a plurality of searches including an exhaustive search and one or more limited searches, with the limited searches comprising:
a first search and a second search, the first search comprising iteratively executing a loop instruction, where a portion of the loop instruction has a first step value, the first search analyzing a first set of pixels in the previous frame and the second search analyzing a second set of pixels, the second search comprising iteratively executing the loop instruction, where the portion of the loop instruction has a second step value, the second search using one of the pixels in the first set of pixels as an anchor point for the second search of the previous frame, wherein the first step value indicates a first spacing between pixels in the first search, the second step value indicates a second spacing between pixels in the second search, and the first spacing is greater than the second spacing; and
a controller comprising a processor separate from the motion estimator and configured to determine the instructions to program the motion estimator to perform one or more of the plurality of searches, the instructions comprising a plurality of operation instructions and parameters, each operation instruction identifying a function to be performed by the motion estimator, at least one operation instruction identifying a first function to be performed by the motion estimator using one or more parameters, wherein the operation instructions comprise a first instruction causing the motion estimator to search macroblocks along a horizontal, vertical, or diagonal line of the previous frame, a second instruction causing the motion estimator to select coordinates from a previous search as the anchor point for a next first instruction, a third instruction causing the motion estimator to terminate the one or more searches, and a fourth instruction causing the motion estimator to repeat one or more previously executed instructions with a second anchor point.

2. The video processor of claim 1 wherein the motion estimator further comprises a SAD computation engine configured to estimate the motion vector.

3. The video processor of claim 2 wherein the SAD computation engine comprises a tree architecture.

4. The video processor of claim 1 wherein the motion estimator includes memory, and wherein the controller is configured to program the motion estimator by loading the instructions into the memory.

5. The video processor of claim 4 wherein the motion estimator is further configured to estimate the motion vector by evaluating a plurality of macroblocks offset from the anchor point in the previous frame, and identify a number of macroblocks being programmable by one or more of the instructions loaded into the memory by the controller.

6. The video processor of claim 5, wherein an offset of one of the macroblocks relative to the anchor point identifies a first point corresponding to a first macroblock, and a displacement value from the first point that identifies a second point corresponding to a second macroblock, wherein the displacement value between each of the macroblocks evaluated is also programmable with said one or more of the instructions.

7. The video processor of claim 5 wherein an offset of one of the macroblocks relative to the anchor point is also programmable with said one or more of the instructions.

8. The video processor of claim 4 wherein the motion estimator is further configured to estimate the motion vector by evaluating a plurality of macroblocks offset from an anchor point in the previous frame, and selecting one of the macroblocks evaluated in response to one or more of the instructions loaded into the memory by the controller.

9. The video processor of claim 8 wherein the motion estimator is further configured to select said one of the macroblocks evaluated having the closest match to the macroblock in the current frame.

10. The video processor of claim 9 wherein the motion estimator further comprises a SAD computation engine configured to compute a SAD between the macroblock in the current frame and each of the macroblocks evaluated in the previous frame, and select said one of the macroblocks evaluated based on the SAD computations.

11. A video processor, comprising:
a motion estimator configured to estimate a motion vector for a macroblock in a current frame by searching for a matching macroblock in a previous frame according to instructions determined by a controller separate from the motion estimator, wherein the search comprises a first search and a second search, the first search comprising iteratively executing a loop instruction, where a portion of the loop instruction has a first step value, the first search analyzing a first set of pixels in the previous frame and the second search analyzing a second set of pixels of the previous frame using one of the pixels in the first set of pixels as an anchor point for the second search, the second search comprising iteratively executing the loop instruction, where the portion of the loop instruction has a second step value, wherein the first step value indicates a first spacing between pixels in the first search, the second step value indicates a second spacing between pixels in the second search, and the first spacing is greater than the second spacing; and a memory configured to store the instructions, the instructions comprising a plurality of operation instructions and parameters, each operation instruction identifying a function to be performed by the motion estimator, at least one operation instruction identifying a first function to be performed by the motion estimator using one or more parameters, wherein the operation instructions comprise a first instruction causing the motion estimator to search macroblocks along a horizontal, vertical, or diagonal line of the previous frame, a second instruction causing the motion estimator to select coordinates from a previous search as the anchor point for a next first instruction, a third instruction causing the motion estimator to terminate the one or more searches, and a fourth instruction causing the motion estimator to repeat one or more previously executed instructions with a second anchor point.

12. The video processor of claim 11 wherein the motion estimator further comprises a SAD computation engine configured to estimate the motion vector.

13. The video processor of claim 12 wherein the SAD computation engine comprises a tree architecture.

14. The video processor of claim 11 wherein the first search includes an evaluation of a plurality of macroblocks offset from an anchor point in the previous frame, wherein the motion estimator is further configured to estimate the motion vector by selecting one of the evaluated macroblocks in response to one or more of the instructions.

15. The video processor of claim 14 wherein the motion estimator is further configured to select said one of the evaluated macroblocks having the closest match to the macroblock in the current frame.

16. The video processor of claim 15 wherein the motion estimator further comprises a SAD computation engine configured to compute a SAD between the macroblock in the current frame and each of the evaluated macroblocks in the previous frame, and select said one of the evaluated macroblocks based on the SAD computations.

17. A method of video processing in an electronic device, comprising:
receiving instructions from a memory, the instructions determined by a first processor and comprising a plurality of operation instructions and parameters, each operation instruction identifying a function to be performed, at least one operation instruction identifying a first function to be performed using one or more parameters; and estimating a motion vector for a macroblock in a current frame using a second processor different than the first processor by searching for a matching macroblock in a previous frame according to the instructions, wherein the search comprises a first search and a second search, the first search comprising iteratively executing a loop instruction, where a portion of the loop instruction has a first step value, the first search analyzing a first set of pixels in the previous frame and the second search analyzing a second set of pixels, the second search comprising iteratively executing the loop instruction, where the portion of the loop instruction has a second step value, the second search using one of the pixels in the first set of pixels as an anchor point for the second search of the previous frame, wherein the first step value indicates a first spacing between pixels in the first search, the second step value indicates a second spacing between pixels in the second search, and the first spacing is greater than the second spacing, wherein the operation instructions comprise a first instruction causing the motion estimator to search macroblocks along a horizontal, vertical, or diagonal line of the previous frame, a second instruction causing the motion estimator to select coordinates from a previous search as the anchor point for a next first instruction, a third instruction causing the motion estimator to terminate the one or more searches, and a fourth instruction causing the motion estimator to repeat one or more previously executed instructions with a second anchor point.

18. The method of claim 17 wherein one or more of the instructions includes a number of pixels representing macroblocks evaluated, an offset relative to the anchor point, and a displacement value between each of the macroblocks evaluated, and the estimation of the motion vector further comprises selecting one of the macroblocks evaluated in response to one or more of the instructions.

19. The method of claim 18 wherein the selected one of the macroblocks evaluated is that which is the closest match to the macroblock in the current frame.

20. The method of claim 18 wherein the selection of said one of the macroblocks evaluated is based on a SAD computation between the macroblock in the current frame and each of the evaluated macroblocks in the previous frame.

21. The method of claim 18 wherein the estimation of the motion vector further comprises evaluating a plurality of macroblocks offset from a second anchor point in response to one or more of the instructions, the second anchor point being selected based on having a small sum of absolute difference value.

22. The method of claim 21 wherein the one or more of the instructions for the evaluation of the macroblocks offset from the second anchor point includes a second displacement value between each of the evaluated macroblocks offset from the second anchor point, the second displacement value between each of the evaluated macroblocks offset from the second anchor point being less than the displacement value between each of the evaluated macroblocks offset from the anchor point.

23. A video processor, comprising:

motion estimation means for estimating a motion vector for a macroblock in a current frame by searching for a matching macroblock in a previous frame according to instructions, the motion estimation means being capable of performing each of a plurality of searches including an exhaustive search and one or more limited searches, with the limited searches comprising a first search and a second search, the first search comprising iteratively executing a loop instruction, where a portion of the loop instruction has a first step value, the first search analyzing a first set of pixels in the previous frame and the second search analyzing a second set of pixels, the second search comprising iteratively executing the loop instruction, where the portion of the loop instruction has a second step value, the second search using one of the pixels in the first set of pixels as an anchor point for the second search of the previous frame, wherein the first step value indicates a first spacing between pixels in the first search, the second step value indicates a second spacing between pixels in the second search, and the first spacing is greater than the second spacing; and control means for determining the instructions for programming the motion estimation means to perform one or more of the plurality of searches, the control means different than the motion estimation means, the instructions comprising a plurality of operation instructions and parameters, each operation instruction identifying a function to be performed, at least one operation instruction identifying a first function to be performed using one or more parameters, wherein the operation instructions comprise a first instruction causing the motion estimator to search macroblocks along a horizontal, vertical, or diagonal line of the previous frame, a second instruction causing the motion estimator to select coordinates from a previous search as the anchor point for a next first instruction, a third instruction causing the motion estimator to terminate the one or more searches, and a fourth instruction causing the motion estimator to repeat one or more previously executed instructions with a second anchor point.

24. The video processor of claim 23 wherein the motion estimation means is further configured to estimate the motion vector by evaluating a plurality of macroblocks offset from an anchor point in the previous frame, the number of macroblocks evaluated being programmable by the control means.

25. The video processor of claim 24 further comprising a displacement value between each of the macroblocks evaluated that is also programmable by the control means.

26. The video processor of claim 24 wherein the offset of one of the macroblocks evaluated relative to the anchor point is also programmable by the control means.

27. A non-transitory computer readable storage media embodying a program of instructions executable by a computer to perform a method of video processing, the method comprising:

receiving instructions, the instructions determined by a first processor and comprising a plurality of operation instructions and parameters, each operation instruction identifying a function to be performed, at least one operation instruction identifying a first function to be performed using one or more parameters; and estimating a motion vector for a macroblock in a current frame using a second processor different than the first processor by searching for a matching macroblock in a previous frame according to the instructions, wherein the search comprises a first search and a second search, the first search comprising iteratively executing a loop instruction, where a portion of the loop instruction has a first step value, the first search analyzing a first set of pixels in the previous frame and the second search analyzing a second set of pixels, the second search comprising iteratively executing the loop instruction, where the portion of the loop instruction has a second step value, the second search using one of the pixels in the first set of pixels as an anchor point for the second search of the previous frame, wherein the first step value indicates a first spacing between pixels in the first search, the second step value indicates a second spacing between pixels in the second search, and the first spacing is greater than the second spacing, wherein the operation instructions comprise a first instruction causing the motion estimator to search macroblocks along a horizontal, vertical, or diagonal line of the previous frame, a second instruction causing the motion estimator to select coordinates from a previous search as the anchor point for a next first instruction, a third instruction causing the motion estimator to terminate the one or more searches, and a fourth instruction causing the motion estimator to repeat one or more previously executed instructions with a second anchor point.

28. The non-transitory computer readable storage media of claim 27 wherein one or more of the instructions includes a number of pixels representing macroblocks evaluated, an offset relative to the anchor point, and a displacement value between each of the macroblocks evaluated, and the estimation of the motion vector further comprises selecting one of the macroblocks evaluated in response to one or more of the instructions.

29. The non-transitory computer readable storage media of claim 28 wherein the selected one of the macroblocks evaluated is that which is the closest match to the macroblock in the current frame.

30. The non-transitory computer readable storage media of claim 28 wherein the selection of said one of the macroblocks evaluated is based on a SAD computation between the macroblock in the current frame and each of the evaluated macroblocks in the previous frame.

31. The non-transitory computer readable storage media of claim 28 wherein the estimation of the motion vector further comprises evaluating a plurality of macroblocks offset from a second anchor point in response to one or more of the instructions, the second anchor point being selected based on having a small sum of absolute difference value.

32. The non-transitory computer readable storage media of claim 31 wherein the one or more of the instructions for the evaluation of the macroblocks offset from the second anchor point includes a second displacement value between each of the evaluated macroblocks offset from the second anchor point, the second displacement value between each of the evaluated macroblocks offset from the second anchor point being less than the displacement value between each of the evaluated macroblocks offset from the anchor point.

* * * * *